United States Patent
Kim (10) Patent No.: US 12,045,305 B2
(45) Date of Patent: Jul. 23, 2024

(54) METHOD AND APPARATUS FOR GENERATING WEB PAGE USING BLOCKS

(71) Applicant: TENTH CO., LTD., Seoul (KR)

(72) Inventor: Chul Hyung Kim, Seoul (KR)

(73) Assignee: TENTH CO., LTD., Seoul (KR)

( * ) Notice: Subject to any disclaimer, the term of this patent is extended or adjusted under 35 U.S.C. 154(b) by 82 days.

(21) Appl. No.: 17/712,227

(22) Filed: Apr. 4, 2022

(65) Prior Publication Data

US 2022/0222310 A1 Jul. 14, 2022

Related U.S. Application Data

(63) Continuation of application No. PCT/KR2020/011316, filed on Aug. 25, 2020.

(30) Foreign Application Priority Data

Oct. 4, 2019 (KR) .................. 10-2019-0123059

(51) Int. Cl.
*G06F 16/958* (2019.01)
*G06F 8/34* (2018.01)
*G06F 9/451* (2018.01)

(52) U.S. Cl.
CPC .............. *G06F 16/986* (2019.01); *G06F 8/34* (2013.01); *G06F 9/451* (2018.02)

(58) Field of Classification Search
CPC . G06F 16/986; G06F 8/34; G06F 8/38; G06F 16/95; G06F 9/451; G06F 40/166; G06F 40/186
See application file for complete search history.

(56) References Cited

U.S. PATENT DOCUMENTS 10,176,154 B2 * 1/2019 Ben-Aharon ....... G06F 16/9577
10,984,177 B2 * 4/2021 Fialkow ................ G06F 16/986
(Continued)

FOREIGN PATENT DOCUMENTS

KR 1020060100491 A 9/2006
KR 101509392 B1 4/2015
(Continued)

OTHER PUBLICATIONS

International Search Report of PCT/KR2020/011316 dated Nov. 25, 2020.

*Primary Examiner* — Asher D Kells
(74) *Attorney, Agent, or Firm* — Dinsmore & Shohl LLP; Yongsok Choi, Esq.

(57) ABSTRACT

A method includes providing a plurality of blocks including information about at least one component constituting a web page; arranging each of the plurality of blocks in a work area based on an input to select and arrange each of the plurality of blocks; revising at least one component included in each of the plurality of blocks based on an input to revise each of the plurality of blocks; outputting a web page based on arrangement information of each of the plurality of blocks for the work area and information about at least one component included in each of the plurality of blocks; and storing information about the web page and information about each of the plurality of blocks in a user block database. An arrangement of each of the plurality of blocks in the work area is changed depending on the resolution of a device accessing the web page.

12 Claims, 10 Drawing Sheets

(56) References Cited

U.S. PATENT DOCUMENTS

| | | | |
|---|---|---|---|
| 11,048,484 B2* | 6/2021 | Gunther, Jr. | G06F 8/38 |
| 2012/0159314 A1* | 6/2012 | Schrier | G06F 16/9577 |
| | | | 715/252 |
| 2012/0192063 A1* | 7/2012 | Koren | G06F 16/9577 |
| | | | 715/252 |
| 2013/0219263 A1* | 8/2013 | Abrahami | G06F 16/9577 |
| | | | 715/234 |
| 2014/0208202 A1* | 7/2014 | Ellis | H04L 67/02 |
| | | | 715/238 |
| 2014/0337767 A1* | 11/2014 | Hsu | G06F 8/34 |
| | | | 715/760 |
| 2015/0012818 A1* | 1/2015 | Reichmann | G06F 40/166 |
| | | | 715/236 |
| 2015/0040000 A1* | 2/2015 | Rice | G06F 40/143 |
| | | | 715/235 |
| 2018/0052808 A1* | 2/2018 | Wan | G06F 16/9577 |
| 2018/0059919 A1* | 3/2018 | Wan | G06F 3/04845 |
| 2019/0155496 A1* | 5/2019 | Bloch | G06F 3/04883 |
| 2020/0372206 A1* | 11/2020 | Fialkow | G06F 16/958 |

FOREIGN PATENT DOCUMENTS

| | | | | |
|---|---|---|---|---|
| KR | 1020170083718 A | 7/2017 | | |
| KR | 101771473 B1 | 8/2017 | | |
| WO | WO-2005033969 A1 * | 4/2005 | | G06F 16/957 |
| WO | 2016129765 A1 | 8/2016 | | |

\* cited by examiner

METHOD AND APPARATUS FOR GENERATING WEB PAGE USING BLOCKS

CROSS-REFERENCE TO RELATED APPLICATIONS

This application is a continuation of International Application No. PCT/KR2020/011316 filed on Aug. 25, 2020, which claims priority to Korean Patent Application No. 10-2019-0123059 filed on Oct. 4, 2019, the entire contents of which are herein incorporated by reference.

TECHNICAL FIELD

The present disclosure relates to a method and apparatus for generating a web page.

BACKGROUND

In general, websites are not easy to produce by ordinary Internet users who do not have professional knowledge or experience in website production, but some websites provide a service that automatically produces websites. However, such a service only can generate a simple function web page that can simply output information input by a user, and it has been difficult for an ordinary person without experience in website production to produce a website with various functions.

In recent years, a website generating solution has been developed that allows non-professionals to easily produce a website. This website generating solution is a skin-centered solution and provides a method for producing a website by importing a previously made skin, individually selecting components (for example, images, text, buttons, etc.) to compose the website, and editing the selected components.

However, according to the above-described conventional website generating solution, if the user uses a website layout provided as a demonstration by the existing website generating solution, a website can be constructed in a short time, but if the website layout provided as a demonstration is not used as it is and is modified to suit the user's taste and purpose, it may take a considerable amount of time to produce a website. Also, when the user wants to produce a website for a specific purpose (for example, a promotional website, etc.), the user must purchase and install a plug-in individually because the existing website generating solution does not provide special functions used for the website.

(Patent Document 1) Korean Patent Laid-open Publication No. 2006-0100491 (published on Sep. 21, 2006)

SUMMARY

Problems to be Solved by the Invention

In view of the foregoing, the present disclosure is conceived to generate various types of web pages by arranging a plurality of blocks selected from among a plurality of blocks including information about at least one component. Also, the present disclosure is conceived to output a web page in which the arrangement of blocks in a work area is changed depending on the resolution of a device accessing the web page. However, problems to be solved by the present disclosure are not limited to the above-described problems. There may be other problems to be solved by the present disclosure.

Means for Solving the Problems

According to an aspect of the present disclosure, a web page generating method includes providing a plurality of blocks including information about at least one component constituting a web page; arranging each of the plurality of blocks in a work area based on an input to select and arrange each of the plurality of blocks in the work area; revising at least one component included in each of the plurality of blocks based on an input to revise each of the plurality of blocks; outputting a web page based on arrangement information of each of the plurality of blocks for the work area and information about at least one component included in each of the plurality of blocks; and storing information about the web page and information about each of the plurality of blocks in a user block database. The arrangement information of each of the plurality of blocks includes position information and resolution information of each of the plurality of blocks. An arrangement of each of the plurality of blocks in the work area is changed depending on the resolution of a device accessing the web page based on the position information and resolution information.

According to another aspect of the present disclosure, a web page generating apparatus that generates a web page includes a block providing unit configured to provide a plurality of blocks including information about at least one component constituting a web page; a block arrangement unit configured to arrange a block selected from among the plurality of blocks based on an input for arrangement in a work area of the web page; a revising unit configured to revise at least one component included in each of the plurality of blocks based on an input to revise each of the plurality of blocks arrange din the work area; a web page output unit configured to output the web page based on arrangement information of each of the plurality of blocks for the work area and information about at least one component included in each of the plurality of blocks; and a storage unit configured to store information about the web page and information about each of the plurality of blocks in a user block database. The arrangement information of each of the plurality of blocks includes position information and resolution information of each of the plurality of blocks. The arrangement of each of the plurality of blocks in the work area is changed depending on the resolution of a device accessing the web page based on the position information and resolution information.

Further, the present disclosure provides a method and device for stably providing a multiplayer-network game even in a mobile environment in which network access is unstable by providing the game through unified synchronous and asynchronous communication.

Effects of the Invention

According to any one of the above-described aspects of the present disclosure, individual functions of a web page can be provided by being modularized and visualized in a block form without a structure (a conventional problem) dependent on one skin (a form in which blocks are previously combined and form a specific layout).

Further, according to the present disclosure, various types of web pages can be generated by arranging a plurality of blocks selected from among a plurality of blocks including information about at least one component. Specifically, according to the present disclosure, a user can generate a layout more easily by combining a plurality of modularized blocks and can also produce a user-customized web page by freely combining or editing blocks to suit the user's purpose of use.

Furthermore, according to the present disclosure, it is possible to output a web page in which the arrangement of blocks in a work area is changed depending on the resolution of a device accessing the web page. Therefore, according to the present disclosure, it is possible to construct a functional web page (for example, a web page including a bulletin board, a gallery, etc.) without a separate development process and thus possible to greatly reduce the web page development cost and reduce the labor cost incurred in running a website.

DETAILED DESCRIPTION

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit" includes a unit implemented by hardware, a unit implemented by software, and a unit implemented by both of them. One unit may be implemented by two or more pieces of hardware, and two or more units may be implemented by one piece of hardware.

Through the whole document, a part of an operation or function described as being carried out by a terminal or device may be carried out by a server connected to the terminal or device. Likewise, a part of an operation or function described as being carried out by a server may be carried out by a terminal or device connected to the server.

Hereinafter, an exemplary embodiment of the present disclosure will be described in detail with reference to the accompanying configuration views or process flowcharts.

Figure 1:
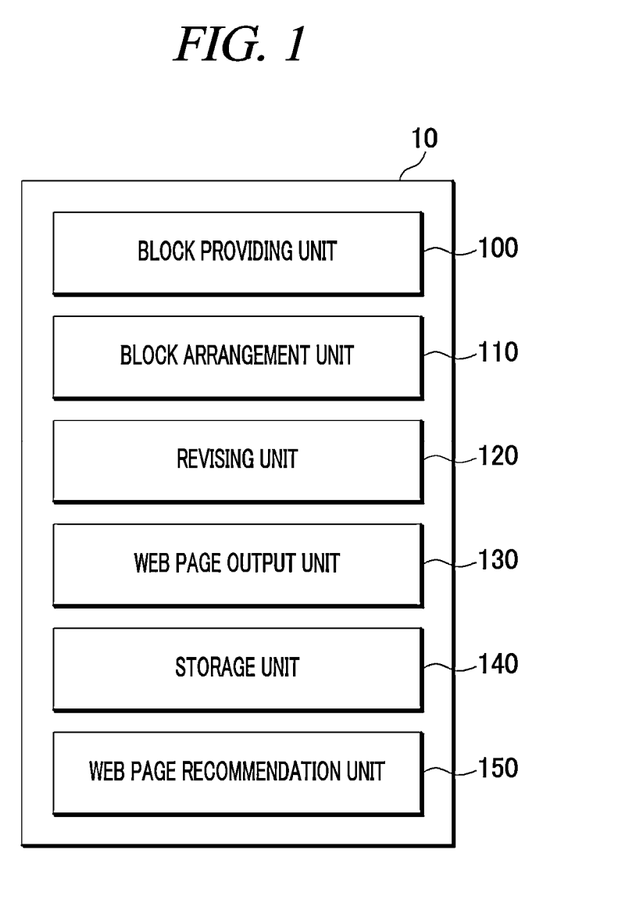
FIG. 1 is a block diagram illustrating a web page generating apparatus according to an embodiment of the present disclosure.

FIG. 1 is a block diagram illustrating a web page generating apparatus 10 according to an embodiment of the present disclosure.

Referring to FIG. 1, the web page generating apparatus 10 may include a block providing unit 100, a block arrangement unit 110, a revising unit 120, a web page output unit 130, a storage unit 140 and a web page recommendation unit 150. However, the web page generating apparatus 10 depicted in FIG. 1 is just one of embodiments of the present disclosure and can be modified in various ways based on the components depicted in FIG. 1. The web page generating apparatus 10 may include a processor and a memory storing machine readable and executable instructions. Each of the block providing unit 100, the block arrangement unit 110, the revising unit 120, the web page output unit 130, the storage unit 140 and the web page recommendation unit 150 may be a program module stored in the memory.

Hereafter, description will be made with reference to FIG. 1 and FIG. 2A through FIG. 5.

The block providing unit 100 may provide a plurality of blocks including information about at least one component (a component having an individual design or function) constituting a web page. The block providing unit 100 may retrieve and extract a plurality of blocks to be used to construct a web page from the entire block database, and provide the extracted plurality of blocks. Here, the plurality of blocks is configured by modularizing and combining at least one component having an individual design (e.g., a text component, an image component, a button component, etc.). For example, a first block may be a block configured by combining a plurality of text components and a gallery component, and a second block may be a block configured by combining a text component and an image component with a background image component.

The authoring screen of a web page includes a work area including at least one of a menu area, a header area, a content area and a footer area, and each of the menu area, header area, content area and footer area may be located at a predetermined position on the web page.

The block providing unit 100 may provide a plurality of blocks corresponding to each area of each work area of the web page. For example, the block providing unit 100 may retrieve a plurality of blocks corresponding to an area requested or selected by a user among a menu area, a header area, a content area and a footer area from the entire block database and provide the retrieved blocks.

Figure 2A:
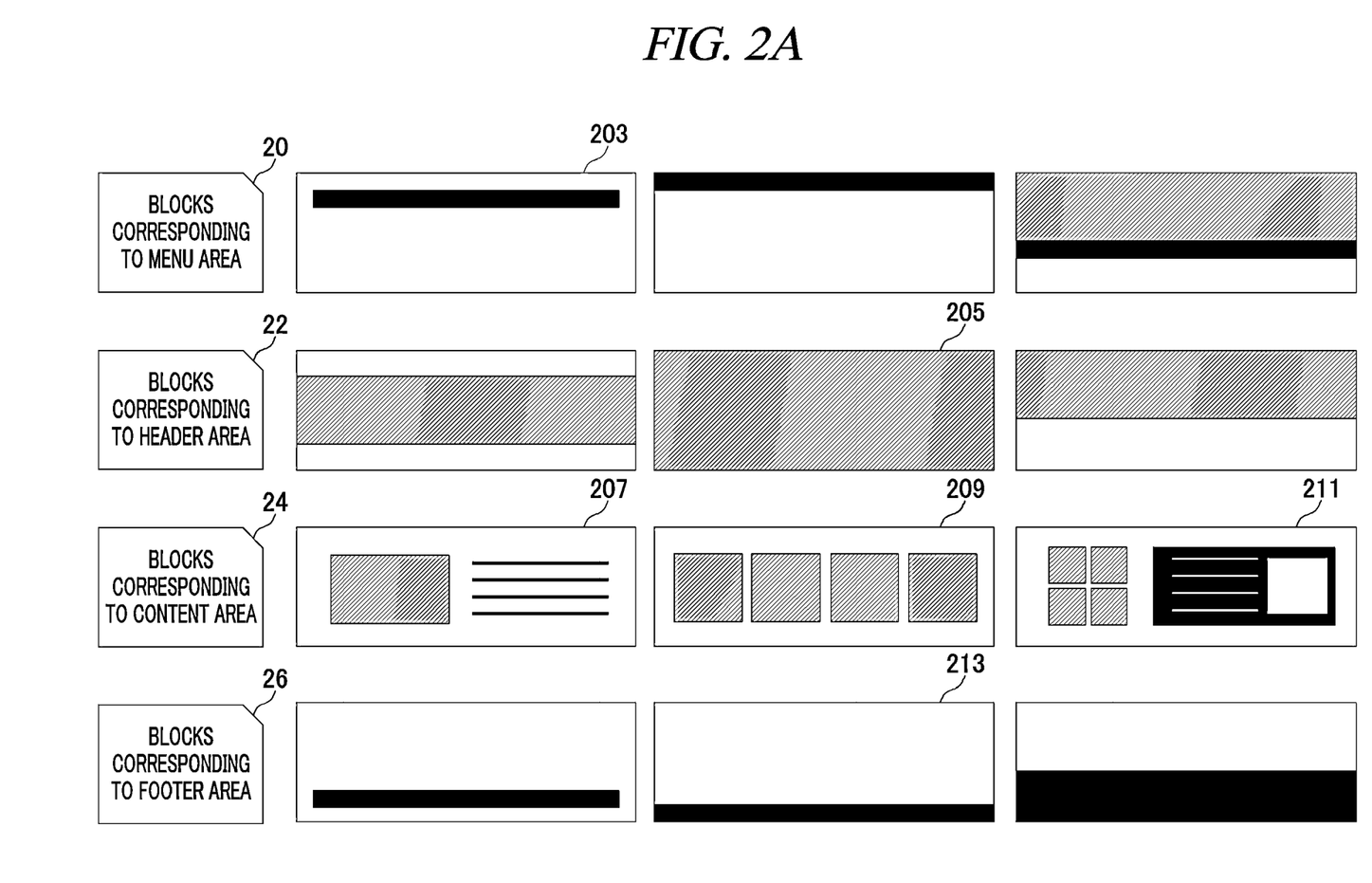
FIG. 2A is a diagram provided to explain a method for generating a web page according to an embodiment of the present disclosure.

Referring to FIG. 2A, the block providing unit 100 may divide the web page into a menu area, a header area, a content area and a footer area, and may provide a plurality of blocks 20 corresponding to the menu area, a plurality of blocks 22 corresponding to the header area, a plurality of blocks 24 corresponding to the content area and a plurality of blocks 26 corresponding to the footer area.

Figure 2B:
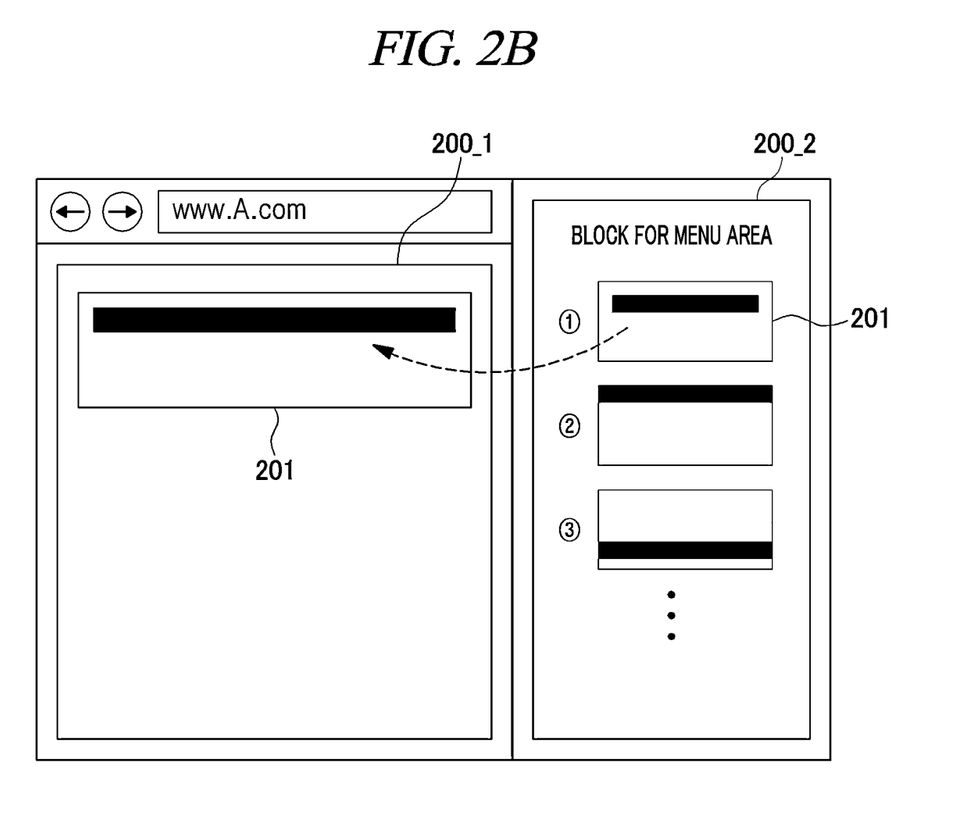
FIG. 2B is a diagram provided to explain the method for generating a web page according to an embodiment of the present disclosure.

For example, referring to FIG. 2B, when a user device accessing a site providing a web page generating solution places a cursor on a top portion of an authoring screen 200-1 of the web page, the block providing unit 100 may provide a plurality of blocks corresponding to each of the menu area and the header area, which may be arranged at the top portion of the web page, through a sub screen 200-2. When the user device places the cursor on a middle portion of the authoring screen 200-1 of the web page, the block providing unit 100 may provide a plurality of blocks corresponding to the content area, which may be arranged at the middle portion of the web page, through the subscreen 200-2. When the user device places the cursor on a bottom portion of the authoring screen 200-1 of the web page, the block providing unit 100 may provide a plurality of blocks corresponding to the footer area, which may be arranged at the bottom portion of the web page, through the subscreen 200-2.

In another embodiment, even when the user device does not place the cursor on the work area of the authoring screen 200-1 of the web page, the block providing unit 100 may simultaneously provide a plurality of blocks corresponding to each of the menu area, the header area, the content area and the footer area through the subscreen 200-2. In this case, a block selected by the user device may be arranged at a predetermined position in the work area of the block on the authoring screen 200-1 of the web page. For example, when the user device selects a first block from among a plurality of blocks corresponding to the menu area on the sub screen 200-2, a second block from among a plurality of blocks corresponding to the content area and a third block from among a plurality of corresponding to the footer area, the first block may be arranged at the top portion of the authoring screen 200-1 of the web page where the menu area will be located, the second block may be arranged at the middle portion of the authoring screen 200-1 of the web page where the content area will be located and the third block may be arranged at the bottom portion of the authoring screen 200-1 of the web page where the footer area will be located.

Returning back to FIG. 1, when a plurality of blocks is selected, the block arrangement unit 110 may arrange each of the plurality of blocks in the work area based on an input for arrangement in the work area. For example, referring to FIG. 2B, when the user device selects a first block 201 from among a plurality of blocks corresponding to the menu area arranged on the sub screen 200-2 and drags and drops it on the top portion of the authoring screen 200-1 of the web page where the menu area will be located, the block arrangement unit 110 may arrange the first block 201 at the top portion. For another example, when the user device double clicks the first block 201 on the sub screen 200-2, the block arrangement unit 110 may arrange the first block 201 at the top portion of the authoring screen 200-1 where the menu area to which the first block 201 belongs will be located.

Figure 2C:
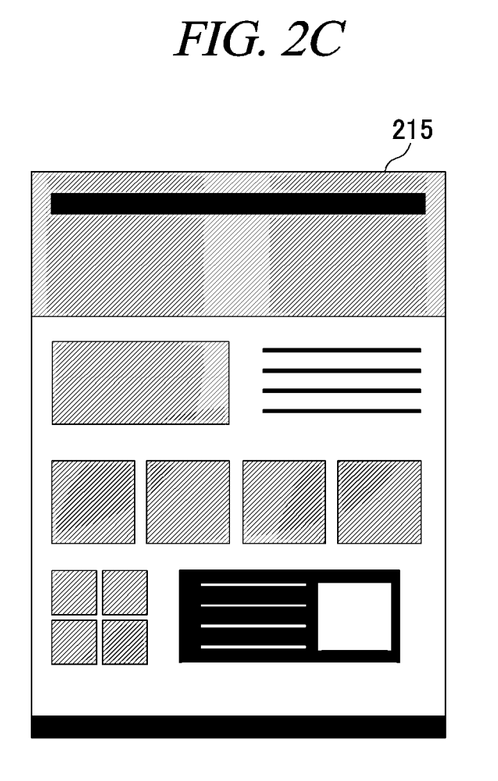
FIG. 2C is a diagram provided to explain the method for generating a web page according to an embodiment of the present disclosure.

For example, referring to FIG. 2A through FIG. 2C, when the user device selects a second block 203 from among a plurality of blocks 20 corresponding to the menu area, a third block 205 from among a plurality of blocks 22 corresponding to the header area, a fourth block 207, a fifth block 209 and a sixth block 211 from among a plurality of blocks 24 corresponding to the content area and a seventh block 213 from among a plurality of blocks 26 corresponding to the footer area, the block arrangement unit 110 may arrange the second block 203 in the menu area of the authoring screen 200-1 of the web page, the third block 205 in the header area of the authoring screen 200-1 of the web page, the fourth block 207, the fifth block 209 and the sixth block 211 in the content area of the authoring screen 200-1 of the web page and the seventh block 213 in the footer area of the authoring screen 200-1 of the web page, as indicated by reference numeral 215.

The block arrangement unit 110 may change the size of each of the plurality of blocks arranged in the work area. For example, if the user puts two or more blocks in the content area of the web page and an input of arrangement and size of the blocks (e.g., an input of arrangement order and size of the blocks adjusted through a block arrangement and size adjustment interface) is received from the user, the block arrangement unit 110 may adjust the arrangement order of each block and change the size of each block based on the input of arrangement and/or size of the blocks. If an input to change the size of only one block among the plurality of blocks is received from the user, the positions and sizes of the other blocks may be changed automatically.

The storage unit 140 may map information of each of the plurality of blocks used in the web page to URL information of the web page (identification information of the web page) and store the information in a tree format in a user block database. For example, the storage unit 140 may store, in the user block database, an image, text, a video, etc. used in each block for each of the plurality of blocks mapped to the URL information of the web page.

Specifically, the storage unit 140 may store, in the user block database, one of the URL information of the web page, an identifier of each of the plurality of blocks used in the web page, arrangement information of each of the plurality of blocks and resolution information of each of the plurality of blocks.

For example, the storage unit 140 may map identifiers of a plurality of blocks, respectively, used in a page corresponding to the page number of the web page to page number and page type information of the web page together with the URL information of the web page and may store them in the user block database. A plurality of blocks combined for each page may be linked to the URL information of the web page and the ID of the page number and stored in a skin structure in the user block database.

For example, referring to FIG. 2B, the storage unit 140 may map the URL information of the web page assigned to the user's ID (a URL address accessible by an external user), an identifier of the first block 201 arranged at the top portion of the authoring screen 200-1 of the web page, arrangement information of the first block 201 and resolution information of the first block 201 to each other and may store them in the user block database.

Meanwhile, each block may include a design block and a functional block. Here, the design block may include at least one of a component including html information, a component including background information, a component including image information and a component including text information. For example, a first design block may be a block composed of a component including html information and a component including background information, a second design block may be a block composed of only a component including background information, a component including image information and a component including text information, and a third design block may be a block composed of a component including html information, a component including background information, a component including image information and a component including text information. Each design block may be provided with an editor capable of editing contents, such as positions, contents, images, etc., of components included in the design block to suit the user's purpose.

Here, the functional block is a block configured to enable interaction with the user of the web page, and may include information for implementing the function of a bulletin board or gallery (e.g., album type gallery, list type gallery, etc.) in the components of the design block (html information, background information, image information and text information). For example, a functional block that implements the function of a bulletin board may include a function to set a write permission or a read permission in the bulletin board, a function to set whether or not to allow comments on the bulletin board, or a function to set whether or not to write a secret post. For example, a first functional block in which the function of a bulletin board is implemented may set a function to set a write permission or a read permission in the bulletin board for a component including text information. For example, a functional block that implements the function of a gallery may include a function to upload or download a photo or image. For example, a second functional block in which the function of a gallery is implemented may set a function for the user to upload a photo/image for a component including image information.

The revising unit 120 may revise at least one component included in each of a plurality of blocks based on an input to revise each of the plurality of blocks.

Specifically, the revising unit 120 may perform at least one of design revision, permission setting and field attribute revision for at least one component included in each of the plurality of blocks. For example, referring to FIG. 2D, the revising unit 120 may provide a design block edit screen window 219 that provides an edit function for a design block 217 selected by the user from among a plurality of design blocks.

Figure 2D:
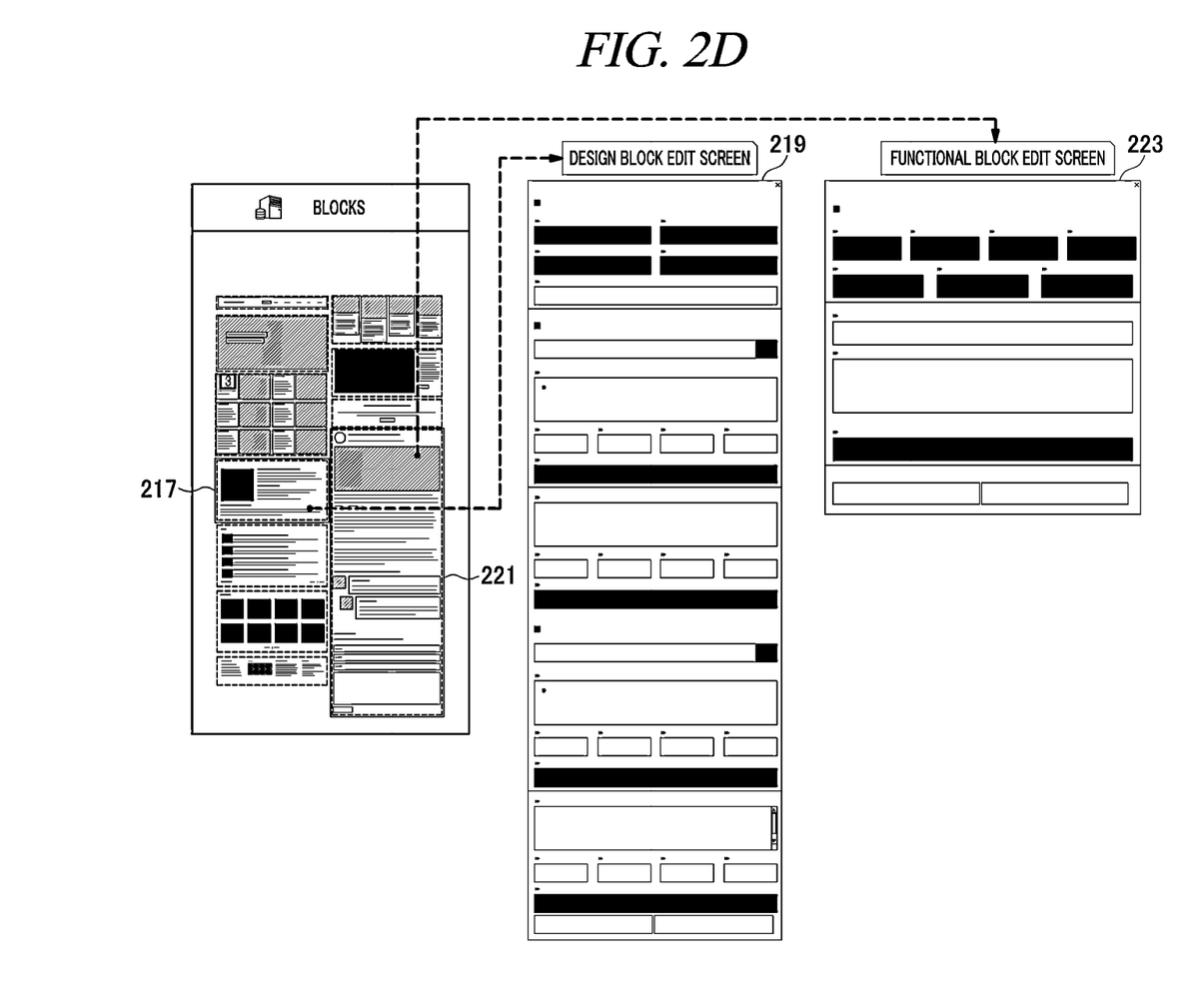
FIG. 2D is a diagram provided to explain the method for generating a web page according to an embodiment of the present disclosure.

The revising unit 120 may revise at least one component included in the selected design block 217 based on revisions to a design (e.g., change in background color, change in position of image information and text information position, change in font size, font boldness and font color, change in text content, etc.) made by the user through the design block edit screen window 219. Alternatively, the revising unit 120 may provide a functional block edit screen window 223 that provides an edit function for a functional block 221 selected by the user from among a plurality of functional blocks.

The revising unit 120 may revise at least one component included in the selected functional block 221 based on revisions to permission setting (e.g., setting of post/bulletin board read permission, write permission, secrete post read permission, etc.) for a bulletin board (or a gallery) and field attributes (e.g., change in title and content of a bulletin board or a gallery, etc.) made through the functional block edit screen window 223.

Also, the revising unit 120 may provide a code content of a design block through a code area, and may revise the content included in the code area based on an input to revise the code area.

Figure 2E:
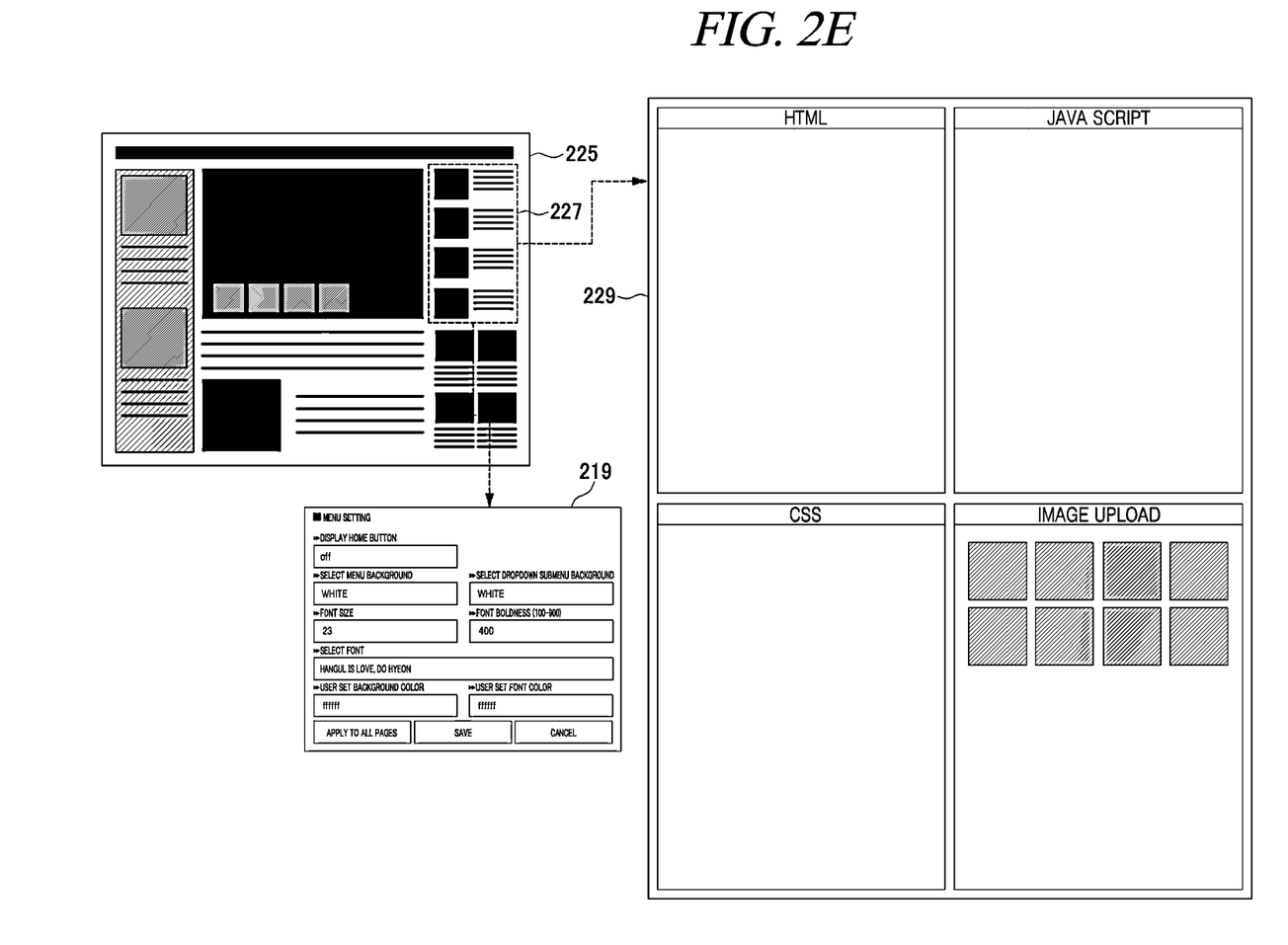
FIG. 2E is a diagram provided to explain the method for generating a web page according to an embodiment of the present disclosure.

For example, referring to FIG. 2E, when the revising unit 120 receives a request to revise a specific design block 227 among a plurality of blocks constituting a web page 225 completed by the user, the revising unit 120 may import the specific design block 227 requested to be revised from the user block database and then provide the design block edit screen window 219 to revise the design of the specific design block 227 or output a code area 229 to revise a code content of the specific design block 227. Here, the code area 229 for the specific design block 227 may include HTML information, JavaScript information and CSS information of the specific design block 227, and may display image information constituting the specific design block 227. Further, the revising unit 120 may revise the content of the code area 229 for the specific design block 227 based on revisions made by the user.

When revision to a specific block of the web page is completed, the storage unit 140 may revise information of the block revised by the user among a plurality of blocks used in the web page mapped to URL information of the web page stored in the user block database and may store it again in the user block database.

Also, when the user requests deletion of a specific design block among a plurality of blocks constituting a completed web page, the revising unit 120 may delete the specific design block from the web page and the storage unit 140 may delete the specific design block requested to be deleted from the user block database.

As described above, according to the present disclosure, the content of at least one block included in a web page can be revised to suit the user's purpose and taste, and the user can freely configure a layout by freely combining a plurality of blocks.

The web page output unit 130 may output a web page based on arrangement information of each of a plurality of blocks for the work area of the web page and information about at least one component included in each of the plurality of blocks.

Specifically, the web page output unit 130 may extract information about a web page requested for access from the user block database and information about each of a plurality of blocks and may output the web page in which each of the plurality of blocks is arranged based on the extracted information about the web page and information about each of the plurality of blocks.

For example, when a request for access to a URL address of a first web page is received, the web page output unit 130 may extract, from the user block database, information about each of a plurality of blocks constituting a first page of the first web page, which is mapped to the URL address of the first web page and stored in the user block database, and may output the first page of the first web page in which the blocks are arranged based on the extracted information about each of the plurality of blocks.

Further, when the page is transitioned to another page (for example, a page corresponding to a menu item selected from among a plurality of menu items displayed on the first page of the first web page) by the user, the web page output unit 130 may extract, from the user block database, information about each of a plurality of blocks constituting the other page and may output the other page of the first web page in which the extracted blocks are arranged.

The web page output unit 130 may output a web page in which the arrangement of each of the plurality of blocks is changed based on information about the web page and information about each of the plurality of blocks from the user block database. Since the positions of the plurality of blocks included in the web page are changed in the work area of the web page depending on the resolution, the user does not have to separately produce a PC web page and a mobile web page for each type of user device nor separately set a change in content depending on the resolution.

Specifically, the web page output unit 130 may change the arrangement of each of the plurality of blocks in the work area based on position information and resolution information of each of the plurality of blocks included in the web page depending on the resolution of a device accessing the web page and may output the web page.

Figure 3:
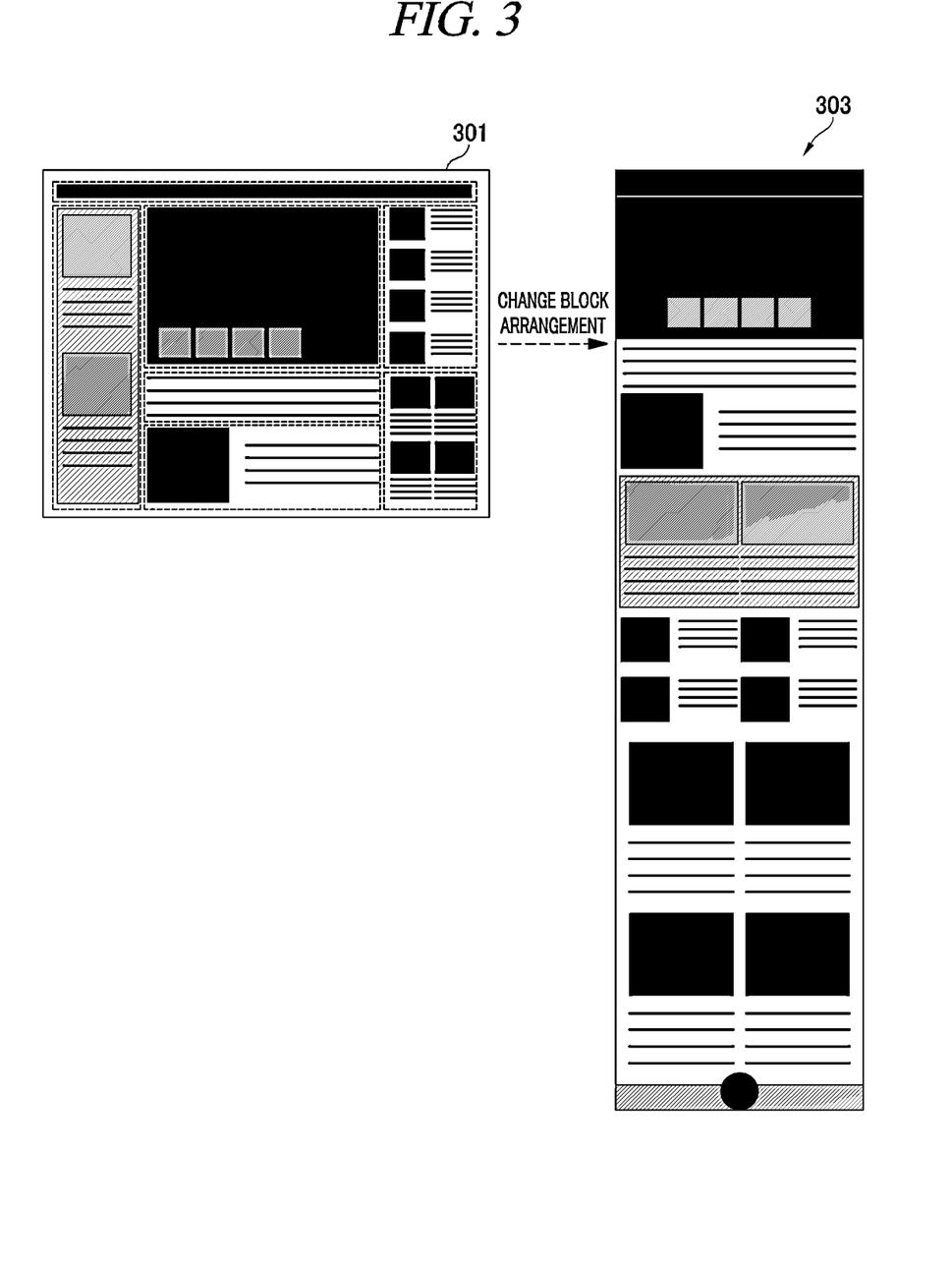
FIG. 3 is a diagram illustrating a screen in which the arrangement of blocks constituting a web page is changed depending on the resolution of a device accessing the web page according to an embodiment of the present disclosure.

For example, referring to FIG. 3, if a device accessing a first web page 301 is a first type of user device (e.g., a laptop computer, a desktop, etc.), the web page output unit 130 may output the first web page 301 through the first type of user device, and if the device accessing a first web page 301 is a second type of user device (e.g., a mobile device, etc.), as indicated by reference numeral 303, the web page output unit 130 may output, through the second type of user device, the first web page 301 of which the size is adjusted depending on the resolution of the second type of user device and in which the positions of a plurality of blocks included in the first web page 301 are rearranged.

Here, the plurality of blocks constituting the first web page 301 has a web standard logical structure in order of being assembled by the user. The plurality of blocks is automatically numbered in logical order and automatically arranged from left to right and top to bottom in a preset order depending on the resolution of the second type of user device, and may be automatically adjusted depending on the screen size of the second type of user device.

Figure 4:
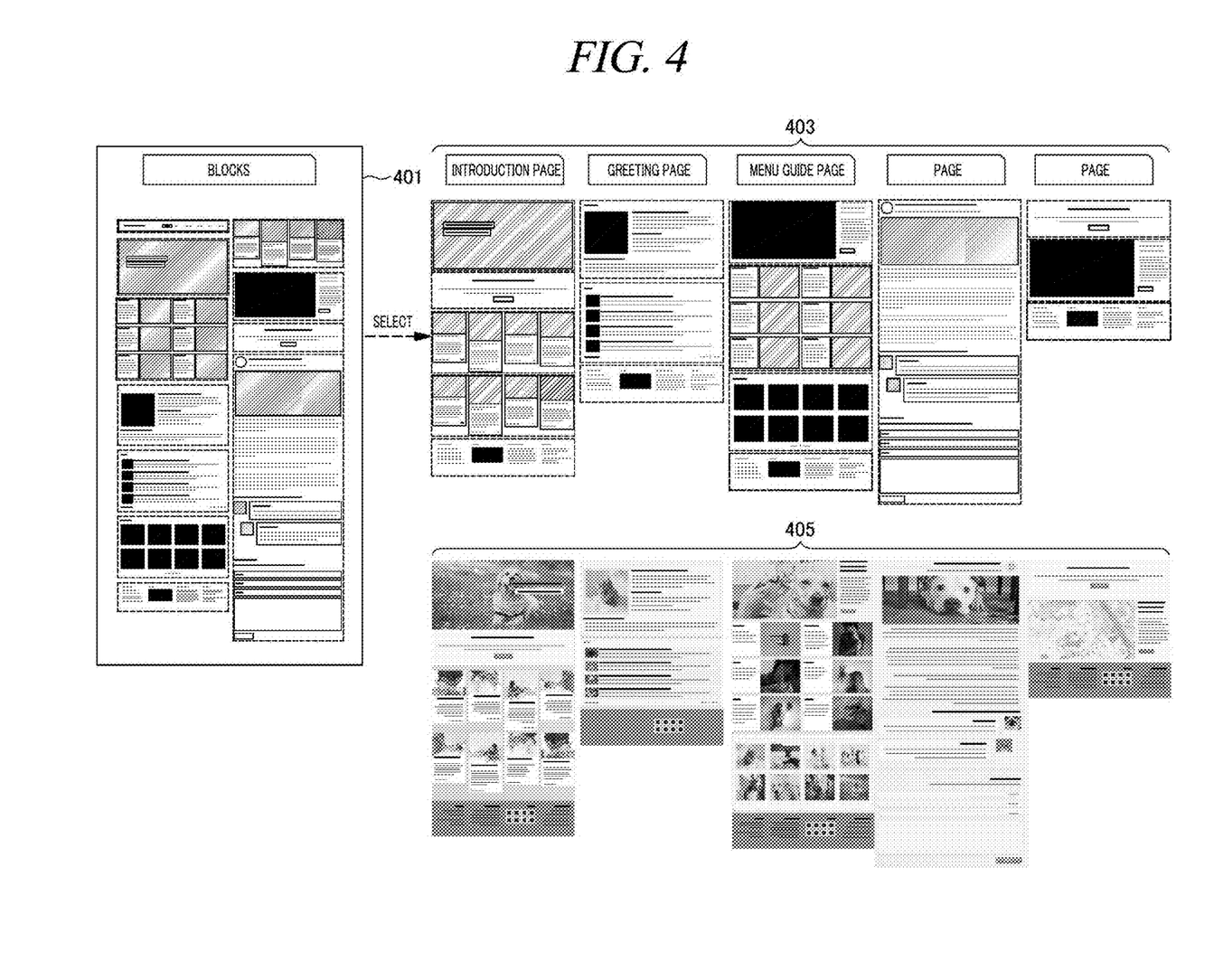
FIG. 4 is an example diagram illustrating a web page generated by assembling a plurality of blocks according to an embodiment of the present disclosure.

As such, according to the present disclosure, it is possible to design web pages 403 composed of various skins by combining blocks selected by the user from among a plurality of blocks 401 as illustrated in FIG. 4. According to the present disclosure, it is possible to link contents (images, text, etc.) 405 set by the user to each of the plurality of web pages 403 designed by the user and then provide the plurality of web pages 403.

Figure 5:
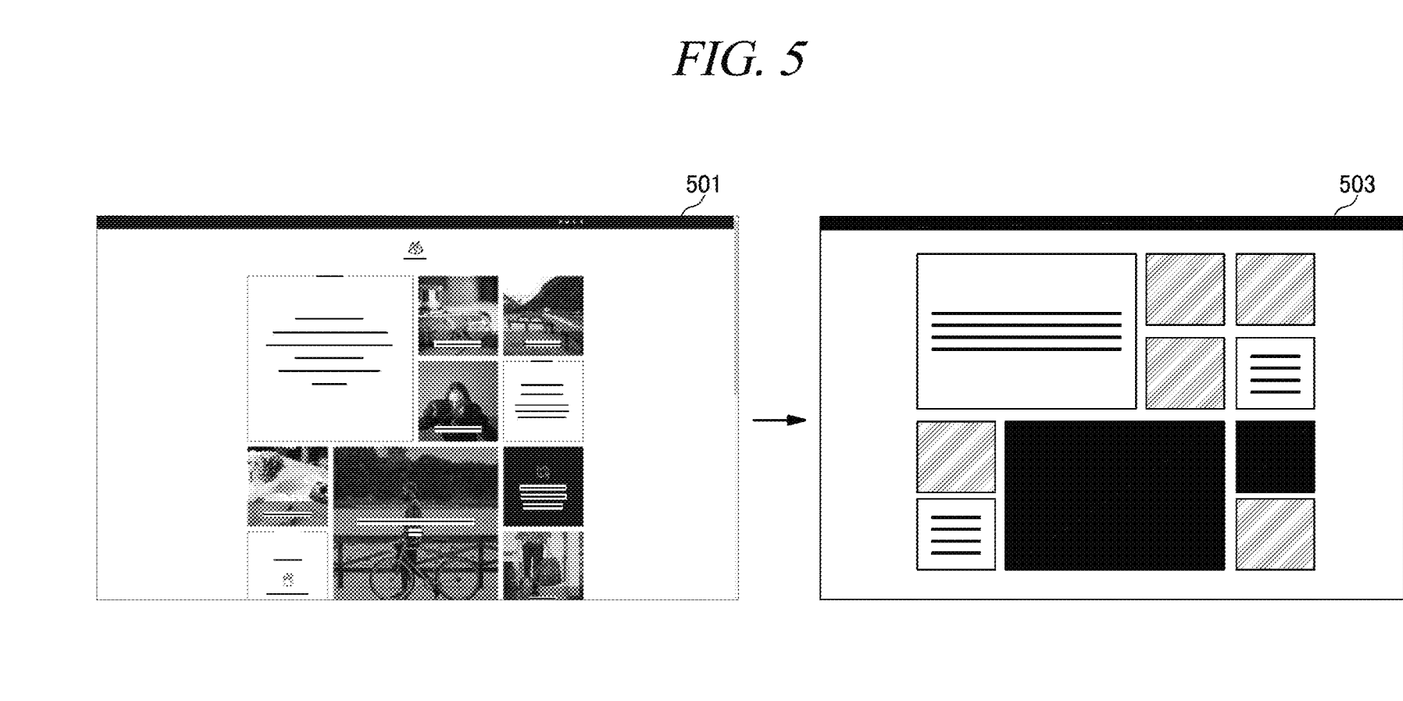
FIG. 5 is a diagram provided to explain a method for editing a web page depending on a block configuration in the web page previously completed by another user according to an embodiment of the present disclosure.

Meanwhile, according to the present disclosure, as illustrated in FIG. 5, a template (i.e., a skin in which previously made design blocks are combined) 503 for a completed web page 501 that has already been generated can be provided to the user, and the user can generate a web page by copying the template for the web page as it is and editing information about each block included in the web page.

Meanwhile, when the web page recommendation unit 150 receives user information (e.g., the user's business type, age, region and preferred color, information about main users of the web page, necessary information about the tendency of the web page, etc.) from the user, the web page recommendation unit 150 may provide a user-customized web page based on the received user information.

Specifically, the web page recommendation unit 150 may select at least one layout from a layout database based on the received user information. Here, a plurality of layouts stored in the layout database may include, for example, a first layout (i.e., a scroll type layout) in which a web content capable of expressing all site maps in a single page can be arranged, a second layout (i.e., a multi-page type layout) having a web page in which each of site maps is composed of independent URLs, a third layout (i.e., a responsive type layout) in which a web content is rearranged in response to the resolution size of the device, and a fourth layout (i.e., an optimized website type layout) in which a web content is selectively arranged depending on the type of a device accessing a web page.

The web page recommendation unit 150 may input the received user information into a web page recommendation algorithm and perform deep learning and then may derive at least one layout from the layout database and select an optimum layout from among the derived layouts.

The web page recommendation unit 150 may generate a sitemap by using a result obtained by performing deep learning on the selected layout again in the web page recommendation algorithm. For example, when a second layout and a fourth layout are selected depending on user information including the cafe industry in Seoul, whose customers are in their 20s to 30s and prefer blue color, the web page recommendation unit 150 may generate a sitemap based on a preference function (e.g., dynamic gallery, dynamic bulletin board, attendance check, reservation function, message function, map, stamp function, etc.) in the web page derived by the web page recommendation algorithm.

The web page recommendation unit 150 may generate a customized web page by arranging, in the work area of the web page, a plurality of blocks derived by inputting the generated sitemap into the web page recommendation algorithm and performing deep learning.

For example, the web page recommendation unit 150 may extract at least one most suitable block (design block, functional block) for each work area of the web page from the entire block database based on the generated sitemap, the selected layout and the user information, and may generate a customized web page by combining the extracted blocks.

Meanwhile, it would be understood by a person with ordinary skill in the art that each of the block providing unit 100, the block arrangement unit 110, the revising unit 120, the web page output unit 130, the storage unit 140 and the web page recommendation unit 150 can be implemented separately or in combination with one another.

Figure 6:
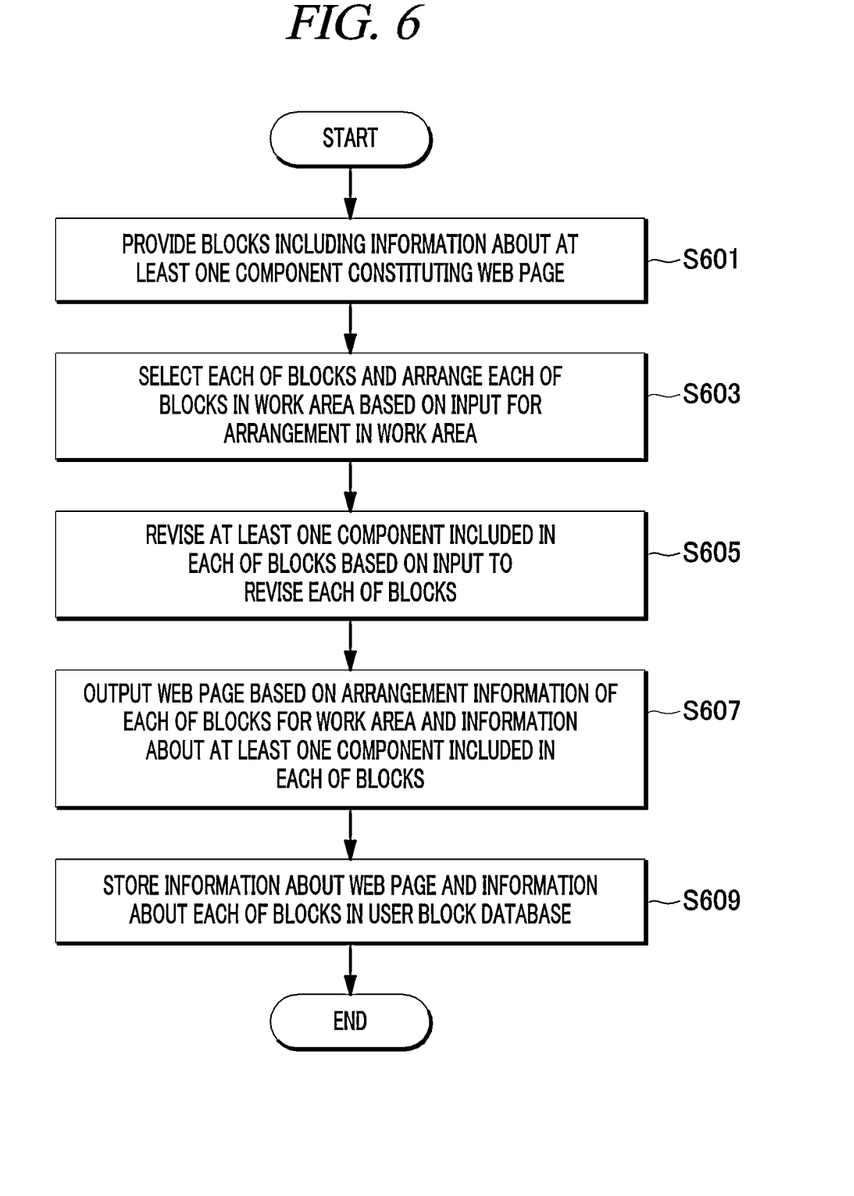
FIG. 6 is a flowchart showing the method for generating web page according to an embodiment of the present disclosure.

FIG. 6 is a flowchart showing the method for generating web page according to an embodiment of the present disclosure.

Referring to FIG. 6, in a process S601, the web page generating apparatus 10 may provide a plurality of blocks including information about at least one component constituting a web page. Herein, the plurality of blocks includes a plurality of design blocks and a plurality of functional blocks, and each design block includes at least one of html information, background information, image information and text information as at least one component, and each functional block includes at least one of html information, background information, image information and text information as at least one component and may further include information for implementing the function of a bulletin board or gallery.

In a process S603, the web page generating apparatus 10 may select each of the plurality of blocks and arranging each of the plurality of blocks in a work area based on an input for arrangement in the work area. Herein, the work area may include at least one of a menu area, a header area, a content area and a footer area.

In a process S605, the web page generating apparatus 10 may revise at least one component included in each of the plurality of blocks based on an input to revise each of the plurality of blocks.

In a process S607, the web page generating apparatus 10 may output a web page based on arrangement information of each of the plurality of blocks for the work area and information about at least one component included in each of the plurality of blocks. Herein, the arrangement information of each of the plurality of blocks may include position information and resolution information of each of the plurality of blocks. Herein, the arrangement of each of the plurality of blocks in the work area may be changed depending on the resolution of a device accessing the web page based on the position information and resolution information of each of the plurality of blocks.

In a process S609, the web page generating apparatus 10 may store information about the web page and information about each of the plurality of blocks in a user block database.

In the descriptions above, the processes S601 through S609 may be divided into additional processes or combined into fewer processes depending on an embodiment. In addition, some of the processes may be omitted and the sequence of the processes may be changed if necessary.

The present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage medium includes all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A web page generating method, comprising:
providing a plurality of blocks including information about at least one component constituting a web page;
arranging each of the plurality of blocks in a work area based on an input to select and arrange each of the plurality of blocks in the work area;
revising at least one component included in each of the plurality of blocks based on an input to revise each of the plurality of blocks;
outputting a web page based on arrangement information of each of the plurality of blocks for the work area and information about at least one component included in each of the plurality of blocks; and
storing information about the web page and information about each of the plurality of blocks in a user block database,
wherein the arrangement information of each of the plurality of blocks includes position information and resolution information of each of the plurality of blocks, and
an arrangement of each of the plurality of blocks in the work area is changed depending on a resolution of a device accessing the web page based on the position information and resolution information, and
each of the plurality of blocks includes a design block,
wherein the revising the at least one component included in each of the plurality of blocks includes:
outputting a code area to revise a code content of the design block and
revising the code content included in the code area, and
the code area includes HTML information, JavaScript information and CSS information of the design block, and
wherein the providing a plurality of blocks includes:
providing an authoring screen including a menu area, a header area, a content area, and a footer area,
providing a plurality of blocks corresponding to each of the menu area and the header area on a subscreen when a user device places a cursor on a top portion of the authoring screen,
providing a plurality of blocks corresponding to the content area on the subscreen when the user device places a cursor on a middle portion of the authoring screen, and
providing a plurality of blocks corresponding to the footer area on the subscreen when the user device places a cursor on a bottom portion of the authoring screen.

2. The web page generating method of claim 1, wherein
the providing the plurality of blocks includes:
providing a plurality of blocks corresponding to each of the menu area, the header area, the content area and the footer area.

3. The web page generating method of claim 1, wherein the revising the at least one component included in each of the plurality of blocks includes:
performing at least one of design revision, permission setting and field attribute revision for the at least one component.

4. The web page generating method of claim 1, wherein the arranging each of the plurality of blocks includes:
changing a size of each of the plurality of blocks.

5. The web page generating method of claim 1, wherein the user block database stores therein at least one of URL information of the web page, an identifier of each of the plurality of blocks used in the web page, the arrangement information of each of the plurality of blocks and the resolution information of each of the plurality of blocks.

6. The web page generating method of claim 1, further comprising:
receiving a request to output the web page from the device;
extracting, from the user block database, information about the web page and information about each of the plurality of blocks; and
outputting the web page in which the arrangement of each of the plurality of blocks is changed based on the information about the web page and the information about each of the plurality of blocks.

7. A web page generating apparatus that generates a web page, comprising:
a block providing unit configured to provide a plurality of blocks including information about at least one component constituting a web page;
a block arrangement unit configured to arrange a block selected from among the plurality of blocks based on an input for arrangement in a work area of the web page;
a revising unit configured to revise at least one component included in each of the plurality of blocks based on an input to revise each of the plurality of blocks arranged in the work area;
a web page output unit configured to output the web page based on arrangement information of each of the plurality of blocks for the work area and information about at least one component included in each of the plurality of blocks; and a storage unit configured to store information about the web page and information about each of the plurality of blocks in a user block database, wherein the arrangement information of each of the plurality of blocks includes position information and resolution information of each of the plurality of blocks, an arrangement of each of the plurality of blocks in the work area is changed depending on a resolution of a device accessing the web page based on the position information and resolution information, and each of the plurality of blocks include a design block, wherein the revising unit is further configured to output a code area to revise a code content of the design block and revise the code content included in the code area, and the code area includes HTML information, JavaScript information and CSS information of the design block, wherein the block providing unit is further configured to provide an authoring screen including a menu area, a header area, a content area and a footer area, provide a plurality of blocks corresponding to each of the menu area and the header area on a subscreen when a user device places a cursor on a top portion of the authoring screen, provide a plurality of blocks corresponding to the content area on the subscreen when the user device places a cursor on a middle portion of the authoring screen, and provide a plurality of blocks corresponding to the footer area on the subscreen when the user device places a cursor on a bottom portion of the authoring screen.

8. The web page generating apparatus of claim 7, wherein the block providing unit is further configured to provide a plurality of blocks corresponding to each of the menu area, the header area, the content area and the footer area.

9. The web page generating apparatus of claim 7, wherein the revising unit is further configured to perform at least one of design revision, permission setting and field attribute revision for the at least one component.

10. The web page generating apparatus of claim 7, wherein the block arrangement unit is further configured to change a size of each of the plurality of blocks.

11. The web page generating apparatus of claim 7, wherein the storage unit is further configured to store, in the user block database, at least one of URL information of the web page, an identifier of each of the plurality of blocks used in the web page, the arrangement information of each of the plurality of blocks and the resolution information of each of the plurality of blocks.

12. The web page generating apparatus of claim 7, wherein the web page output unit is further configured to:

extract, from the user block database, information about the web page and information about each of the plurality of blocks, and output the web page in which the arrangement of each of the plurality of blocks is changed based on the extracted information about the web page and information about each of the plurality of blocks.

* * * * *